(12) United States Patent
Mohamadi

(10) Patent No.: US 9,119,061 B2
(45) Date of Patent: Aug. 25, 2015

(54) INTEGRATED WAFER SCALE, HIGH DATA RATE, WIRELESS REPEATER PLACED ON FIXED OR MOBILE ELEVATED PLATFORMS

(71) Applicant: Farrokh Mohamadi, Irvine, CA (US)

(72) Inventor: Farrokh Mohamadi, Irvine, CA (US)

(73) Assignee: Farrokh Mohamadi, Irvine, CA (US)

(\*) Notice: Subject to any disclaimer, the term of this patent is extended or adjusted under 35 U.S.C. 154(b) by 397 days.

(21) Appl. No.: 13/722,868

(22) Filed: Dec. 20, 2012

(65) Prior Publication Data

US 2013/0248656 A1    Sep. 26, 2013

Related U.S. Application Data

(60) Provisional application No. 61/613,310, filed on Mar. 20, 2012.

(51) Int. Cl.
| | |
|---|---|
| *B64C 13/20* | (2006.01) |
| *H04W 16/00* | (2009.01) |
| *B64C 19/00* | (2006.01) |
| *H04W 16/26* | (2009.01) |
| *H04W 16/28* | (2009.01) |
| *B64C 39/02* | (2006.01) |
| *H04B 7/155* | (2006.01) |

(52) U.S. Cl.
CPC .............. *H04W 16/00* (2013.01); *B64C 19/00* (2013.01); *B64C 39/024* (2013.01); *H04B 7/1555* (2013.01); *H04W 16/26* (2013.01); *H04W 16/28* (2013.01); *B64C 2201/122* (2013.01); *B64C 2201/141* (2013.01); *B64C 2201/146* (2013.01)

(58) Field of Classification Search
CPC .............. B64C 13/20; B64C 2201/122; B64C 2201/141; B64C 2201/146

USPC .................................................. 244/189, 190
See application file for complete search history.

(56) References Cited

U.S. PATENT DOCUMENTS

| | | | |
|---|---|---|---|
| 6,285,878 B1 * | 9/2001 | Lai ................................ | 455/431 |
| 6,505,032 B1 * | 1/2003 | McCorkle et al. ........... | 455/41.2 |
| 6,870,503 B2 | 3/2005 | Mohamadi | |
| 6,934,511 B1 * | 8/2005 | Lovinggood et al. ........ | 455/11.1 |
| 6,963,307 B2 | 11/2005 | Mohamadi | |
| 7,042,388 B2 | 5/2006 | Mohamadi | |
| 7,126,541 B2 | 10/2006 | Mohamadi | |
| 7,126,542 B2 | 10/2006 | Mohamadi | |
| 7,126,554 B2 | 10/2006 | Mohamadi | |
| 7,312,763 B2 | 12/2007 | Mohamadi | |
| 7,321,339 B2 | 1/2008 | Mohamadi | |

(Continued)

*Primary Examiner* — Justin Benedik
(74) *Attorney, Agent, or Firm* — Haynes and Boone, LLP

(57) ABSTRACT

Methods and systems are provided for relocatable repeaters for wireless communication links to locations that may present accessibility problems using, for example, small unmanned aerial systems (sUAS). An sUAS implemented as an easy-to-operate, small vertical take-off and landing (VTOL) aircraft with hovering capability for holding station position may provide an extended range, highly secure, high data rate, repeater system for extending the range of point-to-point wireless communication links (also referred to as "crosslinks") in which repeater locations are easily relocatable with very fast set-up and relocating times. A repeater system using beam forming and power combining techniques enables a very high gain antenna array with very narrow beam width and superb pointing accuracy. The aircraft includes a control system enabling three-dimensional pointing and sustaining directivity of the beam independently of flight path of the aircraft.

14 Claims, 11 Drawing Sheets

(56) References Cited

U.S. PATENT DOCUMENTS

| | | | | |
|---|---|---|---|---|
| 7,352,324 | B2 | 4/2008 | Mohamadi | |
| 7,358,848 | B2 * | 4/2008 | Mohamadi | 340/10.34 |
| 7,414,577 | B2 | 8/2008 | Mohamadi | |
| 7,423,607 | B2 | 9/2008 | Mohamadi | |
| 7,542,005 | B2 | 6/2009 | Mohamadi | |
| 7,548,205 | B2 | 6/2009 | Mohamadi | |
| 7,554,504 | B2 | 6/2009 | Mohamadi | |
| 7,610,064 | B2 | 10/2009 | Mohamadi | |
| 7,683,852 | B2 | 3/2010 | Mohamadi | |
| 7,697,958 | B2 * | 4/2010 | Mohamadi | 455/562.1 |
| 7,728,784 | B2 | 6/2010 | Mohamadi | |
| 7,742,000 | B2 | 6/2010 | Mohamadi | |
| 7,791,556 | B2 | 9/2010 | Mohamadi | |
| 7,830,989 | B2 | 11/2010 | Mohamadi | |
| 7,839,283 | B2 | 11/2010 | Mohamadi | |
| 7,843,992 | B2 | 11/2010 | Mohamadi | |
| 7,855,695 | B2 | 12/2010 | Mohamadi | |
| 7,884,757 | B2 | 2/2011 | Mohamadi et al. | |
| 7,884,776 | B2 | 2/2011 | Mohamadi | |
| 7,884,777 | B2 | 2/2011 | Izadpanah | |
| 2005/0042999 | A1 * | 2/2005 | Rappaport | 455/307 |
| 2006/0206246 | A1 * | 9/2006 | Walker | 701/16 |
| 2010/0225520 | A1 | 9/2010 | Mohamadi et al. | |
| 2010/0327970 | A1 | 12/2010 | Mohamadi | |
| 2011/0068865 | A1 * | 3/2011 | Mohamadi et al. | 330/124 R |
| 2011/0090133 | A1 | 4/2011 | Mohamadi | |
| 2012/0001674 | A1 | 1/2012 | Mohamadi et al. | |

* cited by examiner

INTEGRATED WAFER SCALE, HIGH DATA RATE, WIRELESS REPEATER PLACED ON FIXED OR MOBILE ELEVATED PLATFORMS

CROSS REFERENCE TO RELATED APPLICATIONS

This application claims the benefit of priority from U.S. Provisional Patent Application No. 61/613,310, filed Mar. 20, 2012, which is incorporated by reference.

BACKGROUND

Embodiments of the present invention generally relate to wireless communication systems and, more particularly, to providing relocatable repeaters for wireless communication links at inaccessible—or otherwise problematic—locations using, for example, small unmanned aerial systems (sUAS).

While the commercial sector strives to have wireless gigabit per second (Gbps) and higher data-rate links to address the needs of wide area and metropolitan networking, there is also a need within the intelligence and defense communities for extending the range of point-to-point wireless communication links (also referred to as "crosslinks") with highly secure, high data rate, repeaters that are easily relocatable with very fast set-up and relocating times. The need for such repeaters may also arise in situations where surveillance or security protection is desired—such as for police work, military combat, border crossing or smuggling scenarios, or fire and rescue situations, such as response to natural disasters like earthquakes or hurricanes. A cost effective repeater with substantial transmit output power is needed for maintaining long-range links over the horizon of any terrain to link two data exchange sources at distances of several miles apart. A repeater is needed that can support various covert and military communication data transfer needs and address existing bottlenecks for mission critical information flow. A repeater is also needed that meets current quality of service (QoS) requirements consistent with IEEE (Institute of Electronic and Electrical Engineers) standards and has a small footprint, light weight, and low power consumption for prolonged operations.

BRIEF DESCRIPTION OF THE DRAWINGS

FIG. 8 is a graph showing a radiation pattern for a 16-by-16 element antenna array tile such as shown in. FIGS. 4A and 4B, in accordance with an embodiment.

Figure 1A:
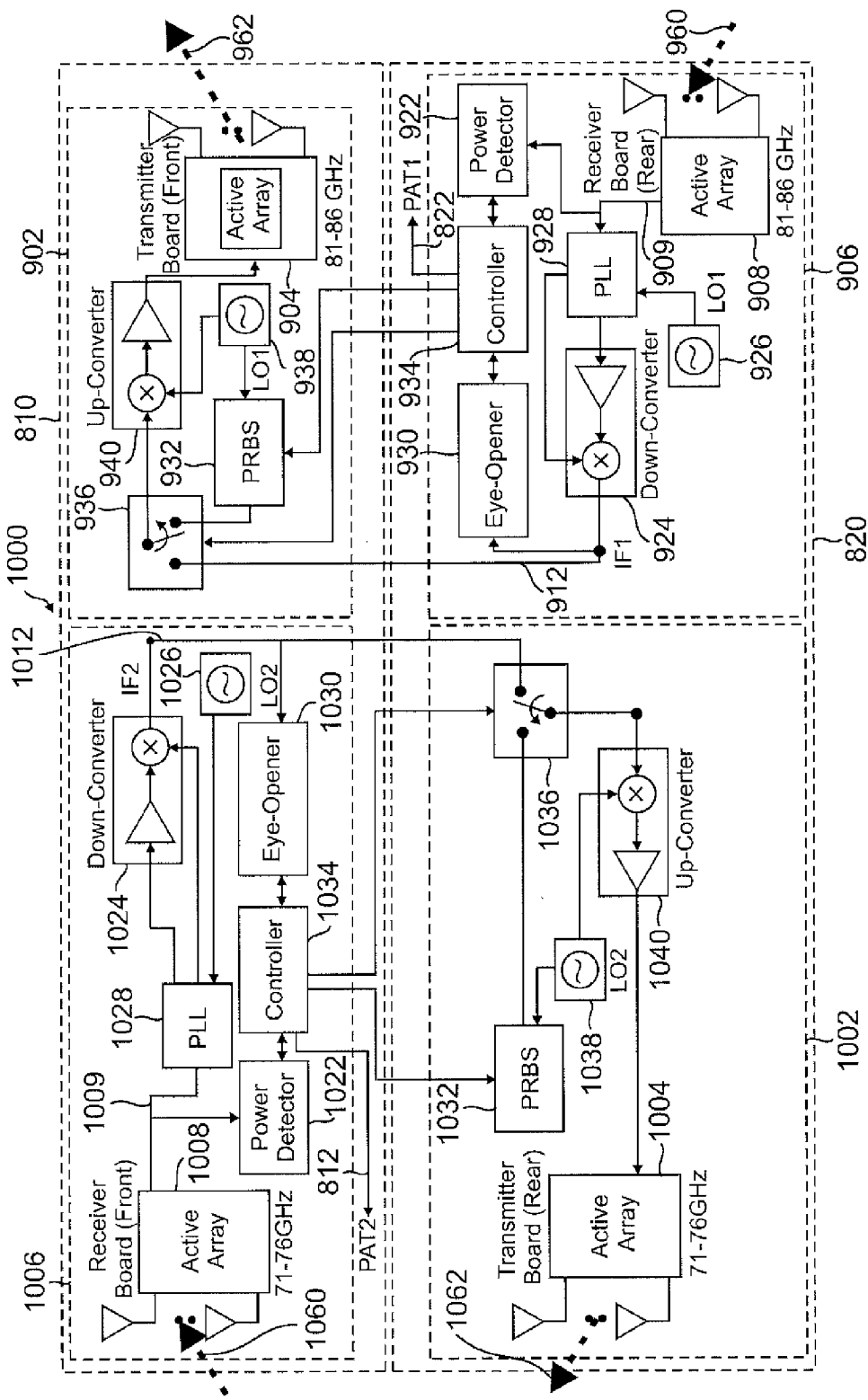
FIG. 1A is a system block diagram illustrating a radio frequency (RF) repeater system and FIG. 1B is system block diagram illustrating tracking and pointing for the links provided by the system of FIG. 1A, in accordance with one or more embodiments of the present invention.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Broadly speaking, methods and systems are provided in one or more embodiments for providing relocatable wireless communication link repeaters that are easily relocatable with very fast set-up and relocating times for establishing and maintaining extended range, highly secure, high data rate intermediate links for point-to-point wireless communication links (also referred to as a "crosslink") at locations that may present various accessibility challenges. Embodiments may employ a repeater mounted, for example, on a small unmanned aerial systems (sUAS) or other portable or mobile platform that can be placed, advantageously in a relatively elevated position, or during a limited window of opportunity to establish or maintain a very high rate data link.

Embodiments may integrate such a repeater system with a vertical take-off and landing (VTOL) small unmanned aerial system (sUAS), for example, to satisfy needs within the intelligence and defense communities and in situations where surveillance or security protection is desired—such as for police work, military combat, border crossing or smuggling scenarios, or fire and rescue situations, such as response to natural disasters like earthquakes or hurricanes for a cost effective crosslink with repeaters, having substantial transmit output power, over the horizon of any terrain to link two data exchange sources at distances of a few miles to many mile apart. Embodiments may also satisfy needs for communication links that support various covert and military communication data transfer needs and addresses existing bottlenecks for mission critical information flow. Embodiments may provide a communication links that meet current quality of service (QoS) requirements consistent with IEEE (Institute of Electrical and Electronics Engineers) standards and has a small footprint, light weight, and low power consumption for prolonged operations. Embodiments may include beam forming and spatial power combining that enable very high transmission power beyond the capabilities of current waveguide and antenna dish based systems, very high antenna array gain, and very narrow beam width with superb pointing accuracy for both links of the repeater.

One or more embodiments may include implementation of a transmitter (TX) fully integrated with an array of power amplifiers (PA) and corresponding antenna arrays to form spatial power combining and beam forming. The active array (e.g., antenna-amplifier array) is highly linear making it suitable for repeaters in point-to-point high data rate, giga-bit per second (Gbps) wireless communication. One or more embodiments may include implementation of a receiver (RX) fully integrated with an array of low noise amplifiers (LNA) and corresponding antenna arrays to form spatial power combining from a narrow beam transmitter. The active array (e.g., antenna-amplifier array) is highly linear and suitable for enhanced sensitivity at the receiver for repeaters in point-to-point high data rate, Gbps wireless communication.

One or more embodiments may include implementation of a planar active array transmitter at V-band (e.g., about 40-75 giga-Hertz (GHz)), E-band (e.g., including two bands of about 71-76 and 81-86 GHz), or W-band (e.g., about 75-110 GHz). One or more embodiments may include implementation of a planar active array receiver at V-band, E-band or W-band. An example embodiment provides a two-channel repeater with a first channel in E-band at 71-76 GHz and a second channel in E-band at 81-86 GHz. One or more embodiments may include implementation of a repeater system with re-generating, re-converting, and re-configuring capability to suppress phase noise, hence, to provide a robust channel for data transfer without deterioration of signal integrity. One or more embodiments may include implementation of a resident pseudo-random coding generator with a loop-back capability for self testing and characterization of bit error rate (BER). One or more embodiments may include implementation of a three dimensional (3-D) steering capability to point and sustain directivity of the antenna array beams independently of flight path. One or more embodiments may include availability of a power meter at each receiver for implementation of additional accuracy in control of the repeater link steering and sustaining directivity of the antenna array beams. One or more embodiments may include improvement in a typical size, weight, and power (SWAP) metric of an order of magnitude for the active array compared to a more conventional dish reflector approach. For example, in one or more embodiments the size of a single transmitter-receiver unit (e.g., front board or rear board as described below) may be less than 4.0 inches by 4.0 inches for a transmitter-receiver unit operating at 95 GHz and 6.3 inches by 6.3 inches for a transmitter-receiver unit operating at 83 GHz; weight of either transmitter-receiver unit may be no more than 7.0 pounds; and DC (direct current) power consumed for each integrated module (e.g. the sUAS including transmitter-receiver units) may be less than 180 Watts (W).

One or more embodiments may include access to the TX and RX intermediate frequency (IF) for implementation of remote steering in addition to implementation of a sub-2.0 GHz signal that supplies information about GPS location of the links. One or more embodiments may include access to the TX and RX intermediate frequency for insertion of a signal with sUAS sensor information (e.g., additional capabilities such as video camera's carried by the sUAS aircraft).

The position and universal time detected by the GPS can be inserted in the IF for providing, for example, repeater performance and flight information.

One or more embodiments may provide scalability of the front-end active array as a full duplex single array beyond W-band link.

In one or more embodiments, a remotely controlled small unmanned aerial system (sUAS)—with vertical take-off and landing (VTOL) capability and capability to hover at a near standstill (e.g., holding station position) and with the capability for autonomous landing and take-off—may include a radio frequency (RF) repeater system, carried by the aircraft, that includes: a first RF receiver configured to receive a first high-data rate, multiplexed, data signal using a planar array of low noise amplifiers and corresponding antenna arrays to form spatial power combining from a narrow beam transmitter on a first channel; a first RF transmitter configured to transmit the first high-data rate, multiplexed, data signal using a planar array of power amplifiers and corresponding antenna arrays to form spatial power combining and beam forming on the first channel; a second RF receiver configured to receive a second high-data rate, multiplexed, data signal using a planar array of low noise amplifiers and corresponding antenna arrays to form spatial power combining from a narrow beam transmitter on a second channel; a second RF transmitter configured to transmit a second high-data rate, multiplexed, data signal using a planar array of power amplifiers and corresponding antenna arrays to form spatial power combining and beam forming on the second channel; a first controller configured to steer a first transmitter antenna beam for the first channel and a second receiver antenna beam for the second channel to a first location; and a second controller configured to steer a second transmitter antenna beam for the second channel and a first receiver antenna beam for the first channel to a second location; and in which the transmitting and receiving are performed by the repeater system to form links for high data rate wireless communication from the aircraft and the aircraft is remote from an operator location.

Figure 1B:
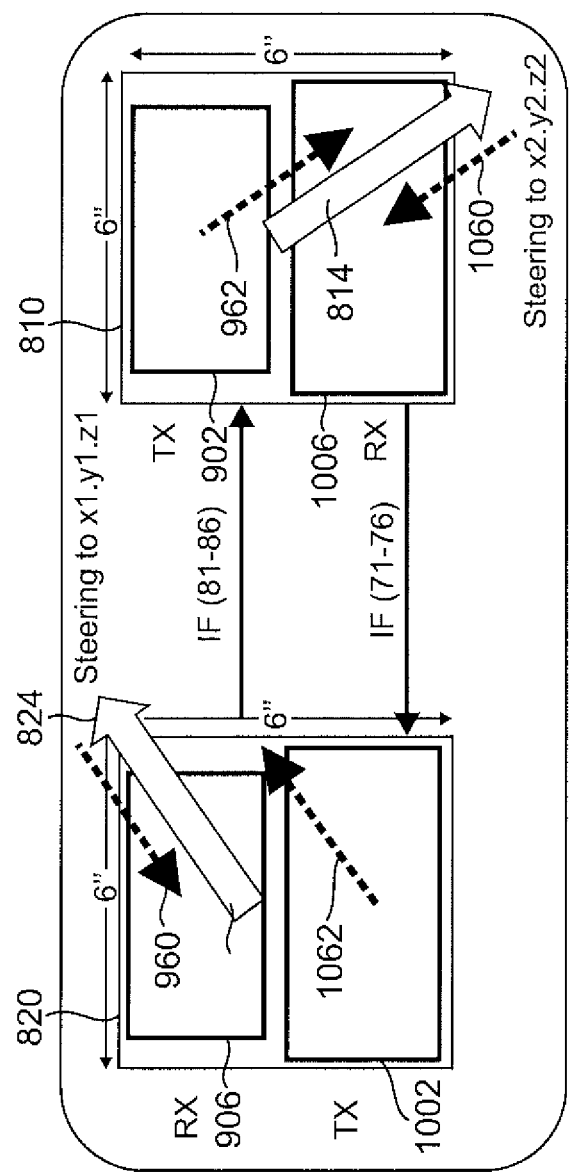

Referring to FIG. 1A and FIG. 1B, a radio frequency (RF) repeater system 1000 is illustrated in accordance with one embodiment. Repeater system 1000 may include a first transmitter 1002 and a first receiver 1006, which may operate as a V-band, E-band, W-band, or Terahertz type 2R (Re-generation, Re-conversion) or 3R (Re-generation, Re-conversion, Re-configuration) giga-bit per second (Gbps) wireless repeater between (or as part of) links on a first channel (e.g., 71-76 GHz as shown in FIG. 1A) carried by signals (or antenna beams) 1060, 1062.

Repeater system 1000 may also include a second transmitter 902 and a second receiver 906, which may operate as a V-band, E-band, W-band, or Terahertz type 2R (Re-generation, Re-conversion) or 3R (Re-generation, Re-conversion, Re-configuration) giga-bit per second (Gbps) wireless repeater between (or as part of) links on a second channel (e.g., 81-86 GHz as shown in FIG. 1A) carried by signals (or antenna beams) 960, 962.

As seen in FIGS. 1A and 1B, second receiver 906 and first transmitter 1002 may be placed on a rear circuit board or plate 820 and may share a pointing and tracking signal 822 to controller 934 that provides steering for both second receiver antenna beam 960 and first transmitter antenna beam 1062 together to a first location having coordinates x1, y1, z1 as indicated by arrow 824 in FIG. 1B.

Similarly, as seen in FIGS. 1A and 1B, first receiver 1006 and second transmitter 902 may be placed on a front circuit board or plate 810 and may share a pointing and tracking signal 812 to controller 1034 that provides steering for both first receiver antenna beam 1060 and second transmitter antenna beam 962 together to a second location having coordinates x2, y2, z2 as indicated by arrow 814 in FIG. 1B. Also as indicated in FIG. 1B, each of front plate 810 and rear plate 820 may have side dimensions no greater than 6.0 inches on a side.

Transmitters 1002, 902 may each use a flat substrate antenna and power amplifier array 1004, 904 (also referred to as "active array") in transmit mode instead of a commonly used hyperbolic waveguide antenna and a single high power amplifier module. Similarly, spatial power combining may be used by receivers 1006, 906 at the receivers' antenna and low noise amplifier arrays 1008, 908 (also referred to as "active array").

Figures 3A, 3B:
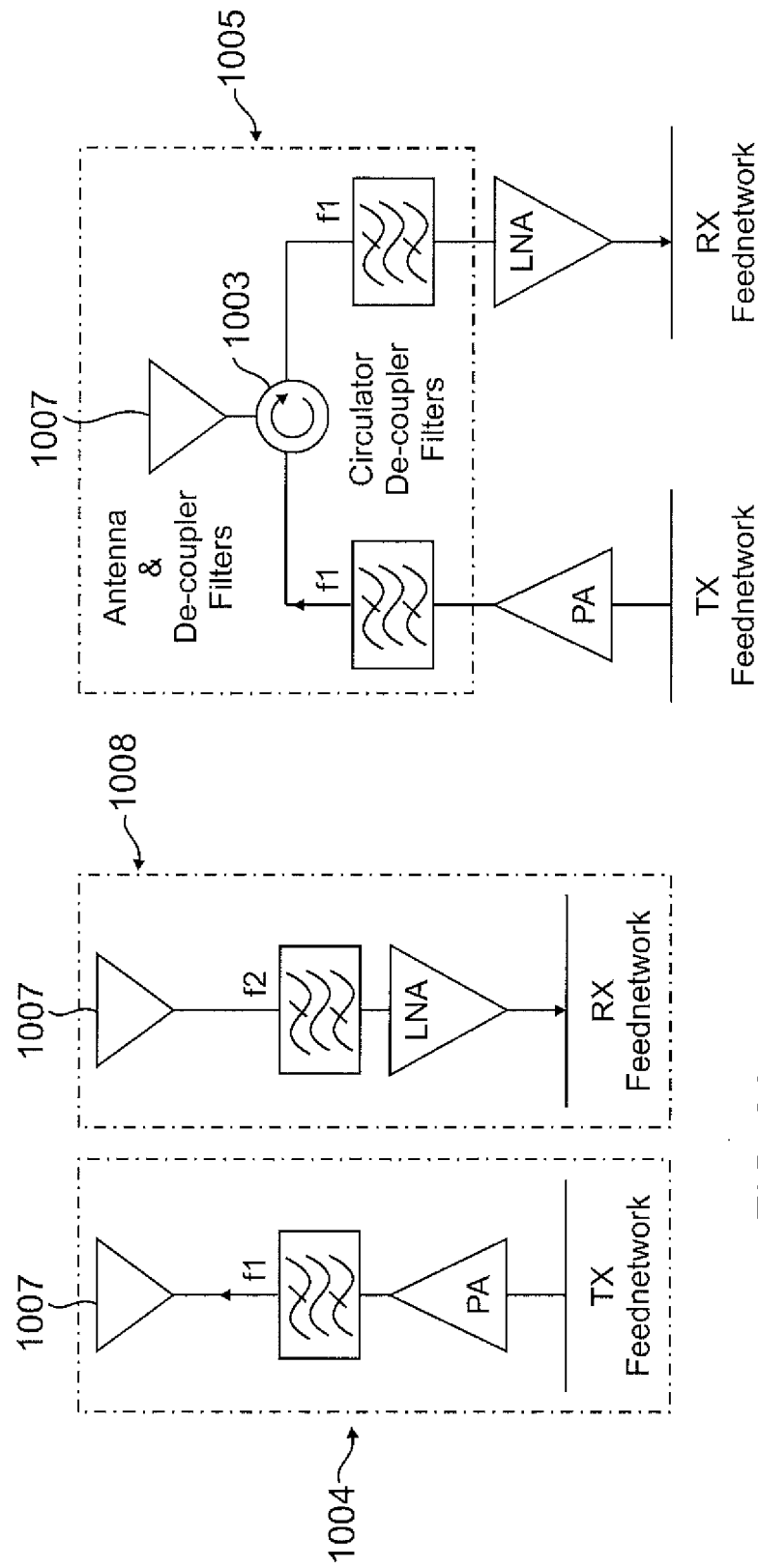
FIGS. 3A and 3B are system block diagrams illustrating separate vs. integrated transmit-receive antenna arrays for repeater systems according to one or more embodiments.

Repeater system 1000 may employ a wafer scale antenna and wafer scale beam forming as disclosed in U.S. Pat. No. 7,312,763, issued Dec. 25, 2007, to Mohamadi and U.S. Pat. No. 7,548,205, issued Jun. 16, 2009, to Mohamadi and virtual beam forming as disclosed in U.S. Pat. No. 8,237,604, issued Aug. 7, 2012, to Mohamadi et al., all of which are incorporated by reference. Repeater system 1000 may include active array antennas 1004, 904, 1008, 908 (a single array may also be used with a circulator as shown in FIG. 3B) implemented using wafer scale antenna module technology. Wafer scale antenna modules (WSAM) are disclosed by U.S. Pat. No. 7,884,757, issued Feb. 8, 2011, to Mohamadi et al. and U.S. Pat. No. 7,830,989, issued Nov. 9, 2010 to Mohamadi, both of which are incorporated by reference. Repeater system 1000 may include phase shifting for beam steering (also referred to as spatial beam steering) in lieu of mechanical steering as disclosed in U.S. Pat. No. 7,697,958, issued Apr. 13, 2010 to Mohamadi, which is also incorporated by reference.

As may be seen in FIGS. 1A, 1B, to provide high integrity data exchange on a communication link, repeater system 1000 may provide multiple enhancement capabilities for processing the RF modulated data.

For example, repeater system 1000 may include a unique power sensor, e.g., power detectors 1022, 922, that may provide a gain control amplifier at the receivers 1006, 906 prior to down-conversion at down-converters 1024, 924 of the RF carrier signal. Local oscillators 1026, 926 and phase locked loops 1028, 928 may operate in conjunction with down-converters 1024, 924 for down-conversion of the RF carrier signals to IF signals 1012, 912.

Also for example, repeater system 1000 may include a unique eye-opener circuit, e.g., eye-opener 1030, 930, that may include matching filters, may enable reduction of inter-symbol interference, and may result in shortening the data transition times and widening of data period.

Also for example, repeater system 1000 may include an in-situ signal generator, e.g., pseudo-random bit sequence (PRBS) coding generators 1032, 932, that may act in conjunction with controllers 1034, 934 and switches 1036, 936, placing the signal generators 1032, 932 or repeater system 1000 in a closed loop, e.g., feedback, state for testing the bit error rate (BER) of the transmitted and received signals and ensuring the integrity of transmitter to receiver operation. The signal generator may also be used between two links to ensure integrity of the transmitted and received signal. Transmitters 1002, 902 may include a local oscillator 1038, 938 for providing timing signals to PRBS coding generators 1032, 932 and to up-convertors 1040, 940 for conversion of IF signals 1012, 912 (via switches 1036, 936) to the signals at the RF carrier frequencies (e.g., signals 1062, 962).

The receiver signals 1009, 909 output from active arrays 1008, 908, after proper signal conditioning (e.g., amplification and combining) may be down-converted (down-converters 1024, 924) to intermediate frequencies (IF 1012, 912) At an end link (not shown) intermediate frequencies (IF 1012, 912) may be fed to a de-multiplexer circuit (not shown) and timing recovery circuit (not shown) to recover clock and data and then decoded by a decoder circuit (e.g., an 8b/10b decoder (not shown)—in telecommunications, 8b/10b coding maps 8-bit symbols to 10-bit symbols to achieve various signal properties including providing enough state changes to allow adequate clock recovery).

Figure 2A:
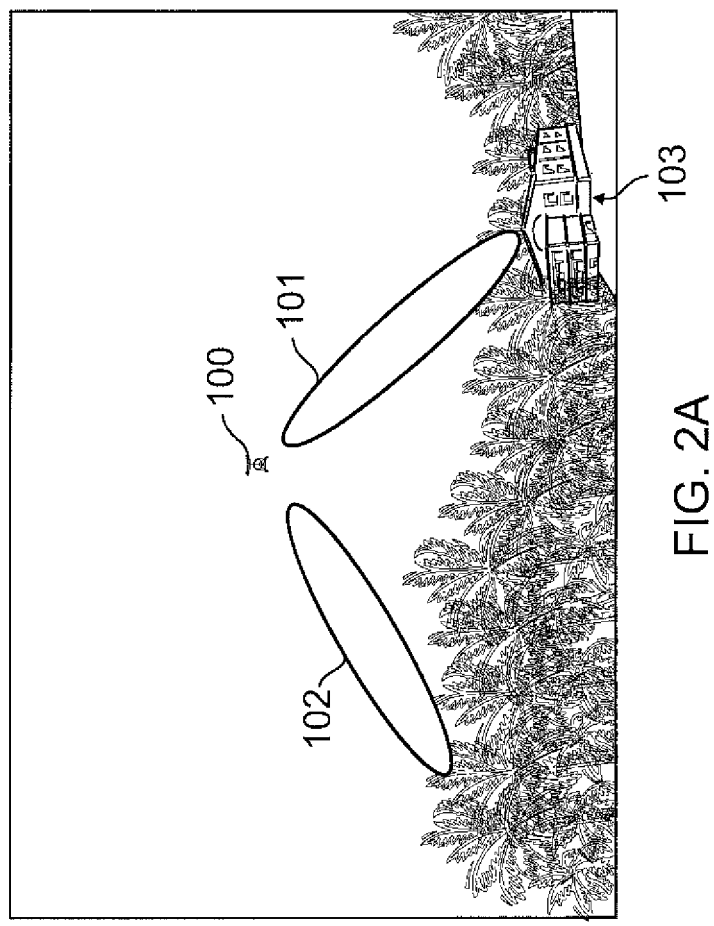
FIG. 2A is a perspective view illustrating a small unmanned aerial system (sUAS) with a repeater system, such as shown in FIG. 1, in accordance with one or more embodiments.

FIG. 2A illustrates a small unmanned aerial system (sUAS) aircraft 100 with a repeater system 1000 providing a first link 101 to a ground station 103 and a second link 102 over the horizon to provide, for example, a signal boost from either link to the other. Aircraft 100 may be, for example, a multi-rotor aircraft having vertical take-off and landing (VTOL) capability. Aircraft 100 may, thus, include a plurality of wing propeller units, each unit including a wing unit propeller, a DC motor, and an ESC (electronic speed control) for driving the motor. Each wing propeller unit may include a local controller and a micro-electro mechanical (MEM) based gyro or accelerometer. Aircraft 100 may also by augmented by attaching guards around the propellers for safe and quiet holding of station position.

In addition to carrying repeater system 1000, aircraft 100 may implement a VTOL capability with its radar scanner 132 (see FIG. 2B) that may operate as an ultra-wideband (UWB) radio frequency (RF) radar that enables a capability of aircraft 100 to perform autonomous take-off and landing. As a dual function radar that operates in the license free band of 3-6 GHz, the UWB RF scanner 132 may also be used, for example, as a motion detector and tracking system for surveillance of live objects inside a compound. The UWB RF scanner 132 may emit rapid wideband pulses (e.g., sub nano-second pulse width) that can penetrate glass, wood, concrete, dry wall and bricks. In the scanner 132 receiver, a detector circuit may be employed to identify the reflections of transmitted pulses so the received periodic pulses may be manipulated to enhance SNR while maintaining very low transmission power and advanced signal processing algorithms may be employed to construct activity detection of a target. By using a remote controller unit 160 (see FIG. 2B) the remotely guided mini-UAV (e.g., aircraft 100) can use the radar capability to land in a stationary position and scan a compound for detection of live objects, e.g., animals or people. While in motion or in stationary detection mode, aircraft 100 may process the data it collects and display the activity level in real-time. Alternatively, a cluster of high resolution optical and thermal cameras may provide persistent imagery of the area under surveillance and take advantage of the Gbps wireless link available on board aircraft 100. Aircraft 100 may have the capability of being configured to scan in the horizontal as well as in the vertical axis and may be capable of performing remote surveillance of premises at extended standoffs from a remote operator of sUAS aircraft 100. The system can be used, for example, to map inside walls of a compound for constructing a 2-D image of the building.

Figure 2B:
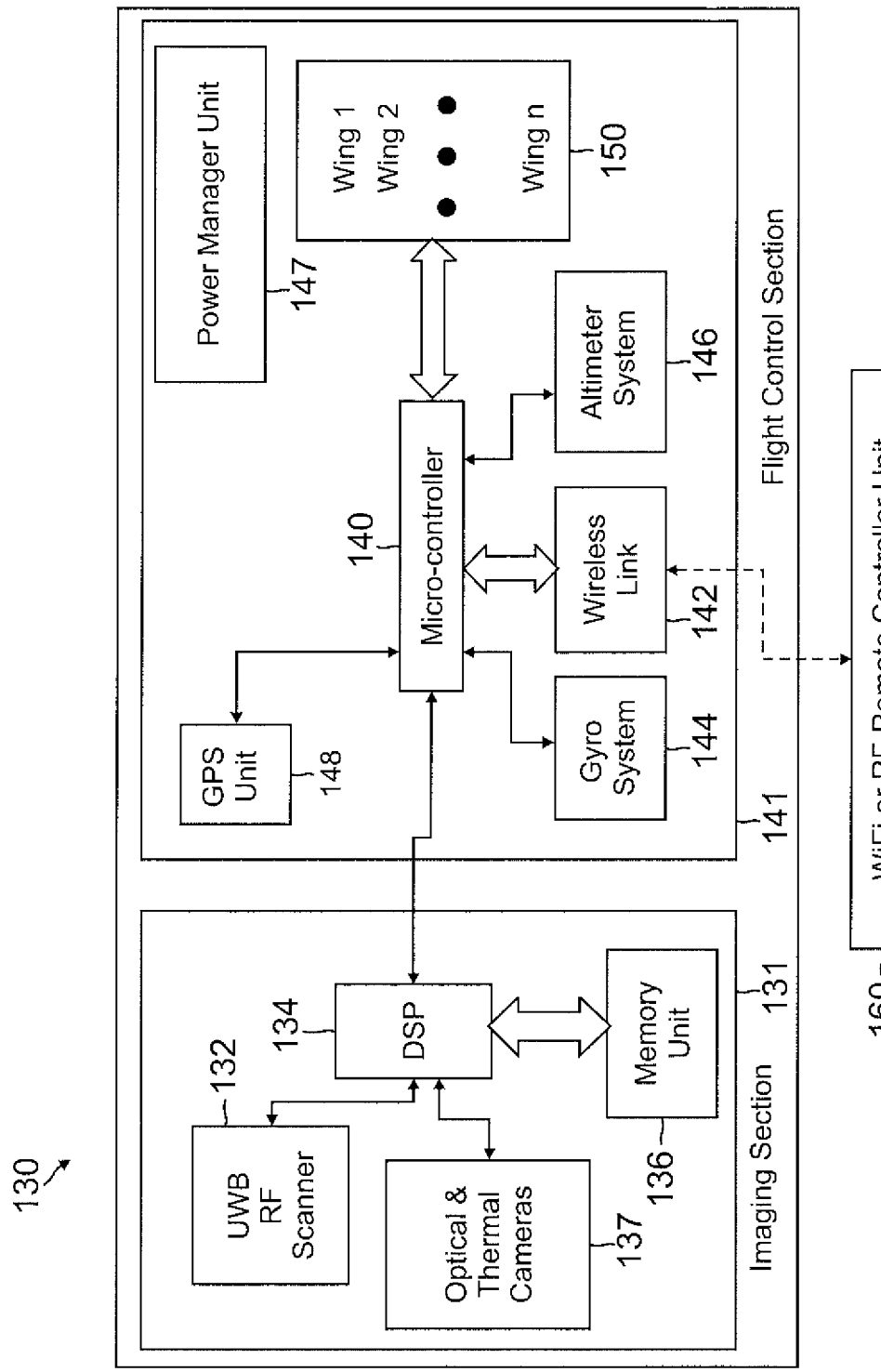
FIG. 2B is a system block diagram illustrating one example of a system architecture for an sUAS aircraft carrying a repeater system according to one or more embodiments.

The autonomous hovering or holding station position of the VTOL sUAS aircraft 100 in a pre-defined waypoint may employ the capabilities provided by a GPS unit 148 (see FIG. 2B). The aircraft 100 may fly to the pre-set GPS coordinates by using a combination of its GPS guidance system, a magnetometer for coarse guidance validation, and a gyro guidance system in cases that GPS information gets denied. Upon reaching the vicinity of the waypoint, the VTOL sUAS aircraft 100 may activate its UWB radar scanner 132 and may hover or circle at a constant altitude around the selected communication link area. The sUAS aircraft 100 may sustain its hovering position by a GPS locked hovering operation.

Aircraft 100 may be remotely operated, for example, by a single specialist. Aircraft 100 may have a total diameter less than 30 inches (in.) and total flying weight, including batteries and UWB RF scanner 132 of less than 10.5 pounds (lb.). Aircraft 100 may have operational capability for vertical takeoff from any flat surface or surface sloped less than 45 degrees to a 100 ft. altitude in less than 10 seconds. Aircraft 100 may have operational capability for hovering from about 1.0 ft. to more than 1000 ft. above ground when locked to the GPS, e.g., using GPS unit 148. Aircraft 100 may have operational capability for sustained operation for at least 8.5 minutes, up to and possibly exceeding 30 minutes. Aircraft 100 may have operational capability for landing non-line-of-site (NLOS) using on-board radar capability.

FIG. 2B illustrates one example of a system architecture for an sUAS aircraft carrying a repeater system and including systems 130 for sensing, imaging, flight control, and telemetry. Sensing, flight control, and telemetry system 130 may include an imaging section 131 and a flight control section 141, which may communicate wirelessly via a remote controller unit included in a control system 160. Wireless control system 160 may conform, for example, to any of the open standards or may be a proprietary control system. Wireless network connectivity may be provided by a wireless control system 160.

Imaging section 131 may include one or more UWB RF scanners (e.g., sensor array 132) such as, for example, the 5 GHz or 60 GHz systems referenced above. In addition, imaging section 131 includes an optical video camera 137. The UWB RF scanner (sensor array unit 132) and camera 137 may be connected to a digital signal processing (DSP) unit 134, which may access a memory unit 136 comprising, for example, a random access memory (RAM). The DSP unit 134 may communicate, as shown in FIG. 2B, with flight control section 141. The UWB RF scanners may scan the ground over a field of view that ranges from 1 to 150 degrees.

Flight control section 141 may include a micro-controller 140. Micro-controller 140 may integrate all sensory and control inputs from the components of flight control section 141 and may provide control and telemetry outputs for UAV 100. As shown in FIG. 2B, micro-controller 140 may receive inputs from wireless link 142, which may provide operator control inputs from an operator at a remote location using, for example, an encrypted WiFi, an encrypted cellular phone, or RF remote controller unit of wireless control system 160. Micro-controller 140 may receive additional control and stabilizing inputs, for example, from gyro system 144 and altimeter system 146. Micro-controller 140 may receive position or location data from GPS system 148. For example, inputs from GPS system 148 may enable UAV 100 to report its position via telemetry and to be monitored over Google® maps, for example, using GPS. Micro-controller 140 may provide control outputs and receive feedback inputs from wing propeller units 150. As disclosed above with reference to FIG. 2A, each wing propeller unit of the plurality of wing propeller units 150 may include a wing unit propeller, a DC motor, and an ESC for driving the motor. Each wing propeller unit may include a local controller and a micro-electro mechanical (MEM) based gyro or accelerometer. Flight control section 141 may also include a power manager unit 147 for providing and regulating electrical power to any of the systems of UAV 100.

FIGS. 3A and 3B illustrate alternative embodiments with separate vs. integrated transmit-receive antenna arrays (e.g., arrays 1004, 1008 vs. cell 1005, which may be wafer scale, beam forming antennas as described above) for repeater system 1000. Although two antenna arrays 1004, 1008 are shown in FIG. 1 for clarity of illustration, use of a circulator 1003 (shown in FIG. 3B) as an isolator switch may enable use of a single antenna cell 1005 for both transmit and receive. In one embodiment, the transmit array 1004 and receive array 1008 may be separately implemented as shown in FIG. 3A. In another embodiment, an integrated TX/RX cell 1005, as shown in FIG. 3B, may function equivalently to transmit and receive arrays 1004, 1008. As shown in FIGS. 3A and 3B, the active arrays 1004, 1005, 1008 may include antenna elements 1007, low noise amplifiers (LNA), power amplifiers (PA), de-coupler filters (f1, f2), and TX and RX feed networks. In one or more embodiments, a power detector unit (e.g., power detector 1022 shown in FIG. 1) may be used for blind equalization-alignment.

Figure 4A:
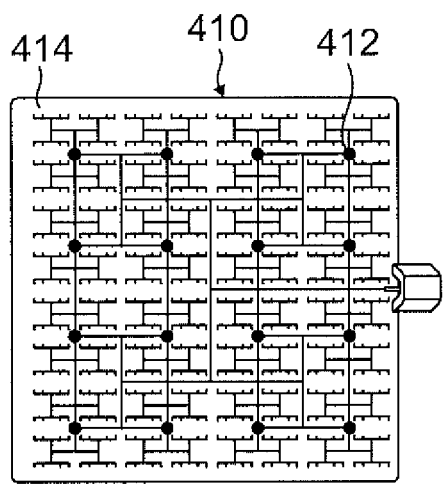
FIGS. 4A and 4B are schematic diagrams showing two examples of power amplifier placement for an antenna array, in accordance with an embodiment.
Figure 4B:
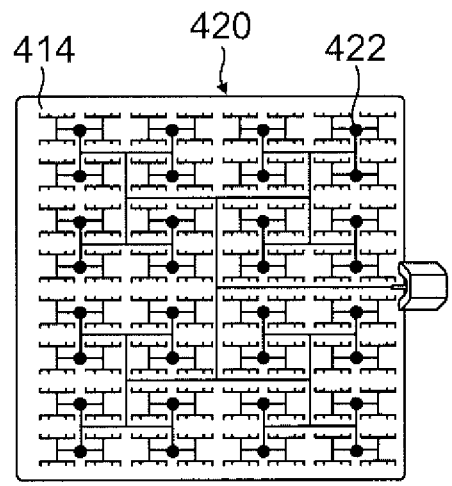

FIGS. 4A and 4B show two examples of power amplifier placement for an antenna array, such as arrays 1004, 1008 or cell 1005. FIG. 4A shows a 16-by-16 antenna array 410, with 16 power amplifiers 412—implemented in Gallium-Nitride (GaN)—feeding 256 antenna elements 414, and FIG. 4B shows a 16-by-16 antenna array 420, with 32 power amplifiers 422—implemented in Gallium-Arsenide (GaAs)—feeding 256 antenna elements 414. Either array 410, 420 may be referred to as a "tile". The spatial combiner of each tile may be manufactured using an H-tree technique of the planar active array, as seen in FIGS. 4A, 4B.

Figure 5:
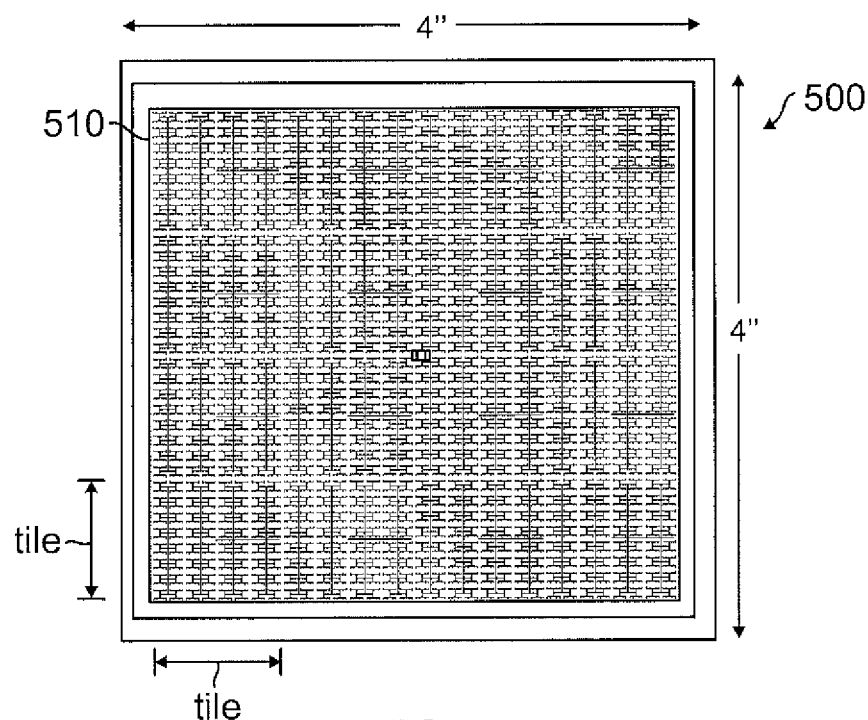
FIG. 5 is a schematic diagram showing an example of a 64-by-64 element antenna array made up of 16-by-16 element antenna array "tiles" such as shown in FIGS. 4A and 4B, in accordance with one or more embodiments.

FIG. 5 shows an example of a 64-by-64 element antenna array 500 made up of 16-by-16 element antenna array "tiles" such as shown in FIGS. 4A and 4B. The larger array 500, shown in FIG. 5, may comprise an array, for example, of 4 tiles by 4 tiles for a 64-by-64 element (4098 antenna elements) antenna array with 32-by-32 (1024) power amplifiers (using a GaAs array tile with twice the amplifiers of GaAs array tile 420 as in FIG. 4B) or 16-by-16 (256) power amplifiers (using a GaN array tile 410 as in FIG. 4A). With power distribution to a plate transmitter (TX) with 4 tiles by 4 tiles (64-by-64 elements antenna array and 32-by-32 PA in GaAs or 16-by-16 PA in GaN) and for its corresponding receiver (RX) with similar LNA array implemented using low power GaAs or GaN power amplifiers, linearity of QAM-16 (16-symbol quadrature amplitude modulation) and DBPSK (differential binary phase shift keying) for, respectively, a robust 10 Mbps link or 1.0 Gbps Ethernet link may be achieved. Moreover, the light planar module that can be assembled with electronically controlled phased arrays as the beam steering dynamic range for a vertical takeoff and landing small unmanned system (VTOL sUAS) is within the capability of the electronic phase shifters. Furthermore, the tiled arrays are based on an architecture that can easily replace the module with higher power output based on availability of GaN based PA arrays to extend the link range to 100 kilometers (km).

In one alternative embodiment, transmitters and receivers of repeater system 1000 may operate in W-band to gain higher gain from spatial combining and beam forming, and may be implemented with SiGe components. In this approach, both TX and RX may be at the W-band. In one or more embodiments, both TX and RX may share the same array. Since formation of the beam is in the spatial combining and power amplifier and low noise amplifiers, the cross coupling of a high power TX to RX input may be eliminated. As a result, a high gain (42 dBi) array 500 can be used with 4.0 inch per side dimensions (as seen in FIG. 5) that can be placed in a 6.0 inch (or less) diameter substrate and, further, may increase the link range to 100 km.

In one or more embodiments, spatial power combining separates the power splitting network and the power combining network. The uniformity of heat transfer may assure long-term reliability for the array at par with the single cell reliability. This may be due to the arrangement of total power budget that has been equally divided to the total number of the PA cells, and keeping the PA cells separated at multiples of the wavelength in the surrounded dielectric. Thus embodiments may address critical issues for high-power combining at this high frequency range (e.g., V, E, and W-band), including parasitic losses, system complexity, and overall thermal management.

As seen in FIG. 5, a planar array of GaAs power amplifiers may be placed on a low dielectric substrate 510. The power divider network that connects the PA's input and the DC bias network may also be integrated. At the output of each PA cell, gold bumps with fine pitches may be patterned and formed to facilitate the interconnection to the inputs of an array of antenna cells on a high-quality microwave substrate. Since each PA cell may directly feed multiple antenna elements, there may be a lossy power distribution network after the PA array, but all major transmission line loss, however, may be before the PA. By adjusting the PA gain setting or inserting an additional gain stage before the PA to compensate the power divider loss, it becomes possible to maintain the maximum output power output of the PA cell, hence, to increase the power efficiency for better than 20%.

To handle the heat generated by the PA array, a heat sink may be attached to the backside of the substrate 510. Since all RF and bias signal distributions may be at the top side of the substrate 510, there may be a need to access the backside of the substrate for signal routing. By feeding the transmitter from the side, however, it may be possible to directly attach a heat sink on the backside of substrate 510, yet affect the PA performance very negligibly due to increased insertion loss.

Figure 6:
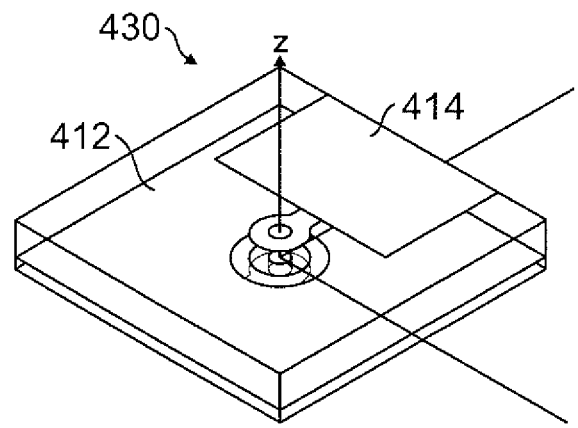
FIG. 6 is a perspective view diagram illustrating the structure of a power amplifier-antenna element, in accordance with an embodiment.

FIG. 6 is a perspective view diagram illustrating the structure of a power amplifier-antenna element 430 of active array 410, 420, or 500. As seen in FIG. 6, for the combiner implementation, the plate for antenna element 414 and the PA 412 (GaAs PA 422 may be implemented similarly) are separated for clarity of illustration. As shown in FIG. 6, the antenna element 414 and PA 412 may be bonded together by a flip-chip technique. The array or tile may use a multilayer structure with L-probe proximity coupling to improve the bandwidth. The receiver array may be implemented with the same type of arrangement with the exception that the receiver array feeds an array of LNAs instead of PAs.

Figure 7:
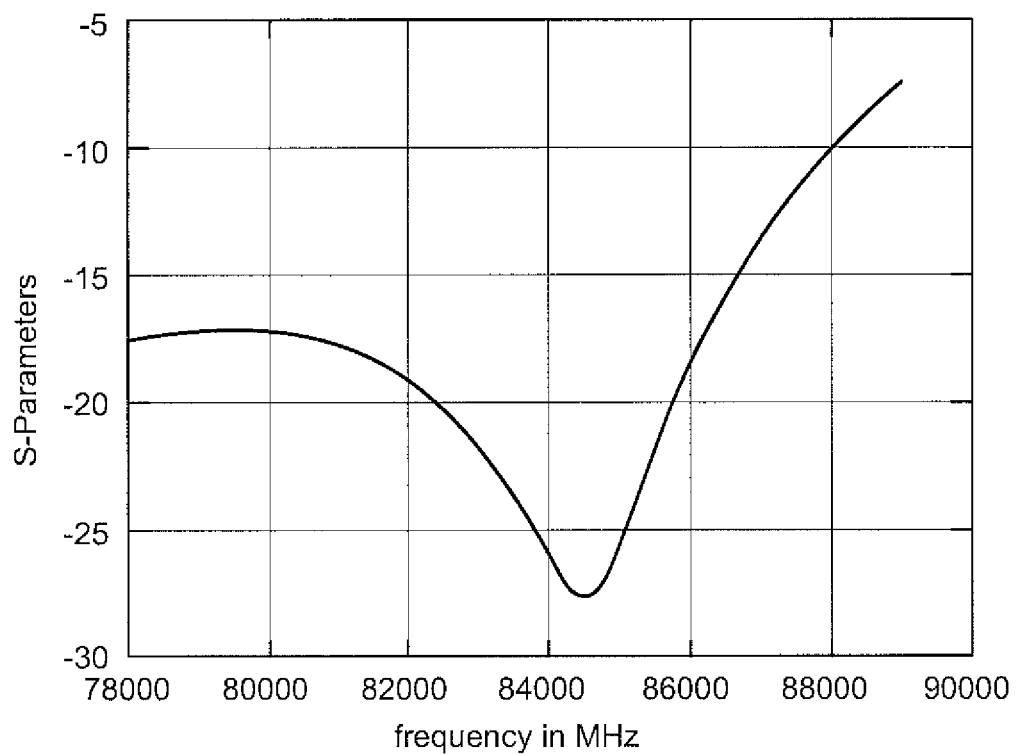
FIG. 7 is a graph illustrating return loss of a single power amplifier-antenna element, such as that shown in FIG. 6, in accordance with an embodiment.

FIG. 7 is a graph illustrating return loss of a single power amplifier-antenna element 430, such as that shown in FIG. 6. FIG. 7 shows the single element's (430) return loss (in dB) vs. frequency (in MHz). As can be seen in FIG. 7, the very broadband performance of power amplifier-antenna element 430 can cover the band of interest (e.g., 78-90 GHz) easily.

Figure 8:
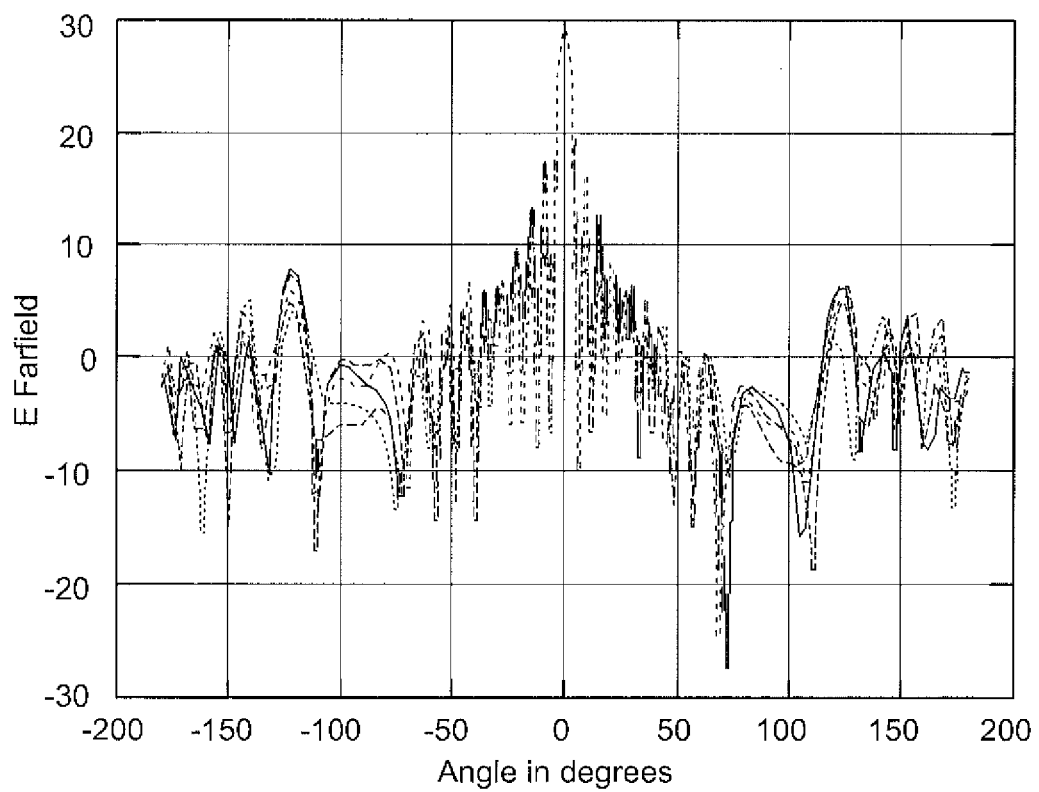

FIG. 8 is a graph showing a radiation pattern for a 16-by-16 element antenna array tile such as shown in FIGS. 4A and 4B. FIG. 8 shows the radiation pattern of the 16×16 cell for the E-plane (e.g., assuming a linearly-polarized antenna, a plane containing the electric field vector and the direction of maximum radiation).

Figure 9:
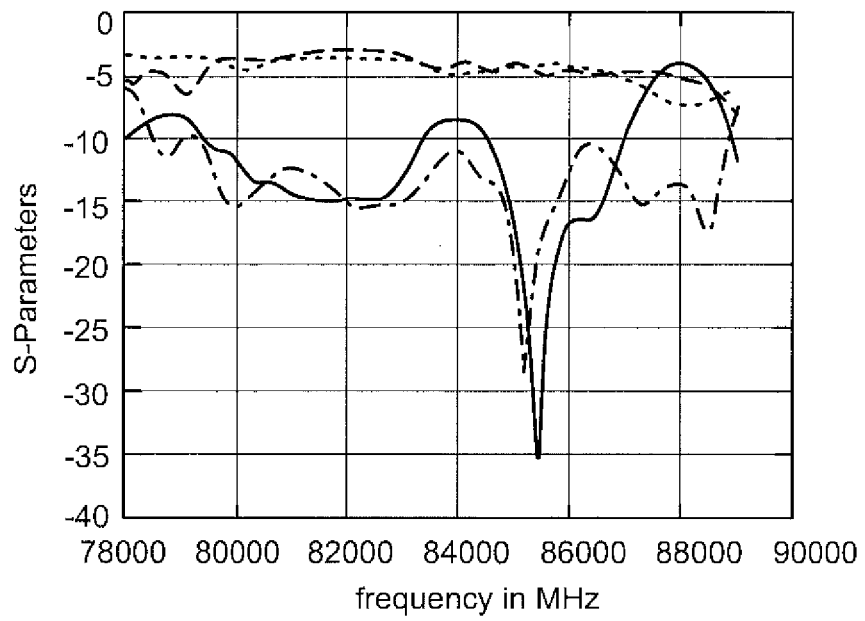
FIG. 9 is a graph showing an example of leakage loss for a pair of 16-by-16 element antenna array tiles, in accordance with an embodiment.

FIG. 9 is a graph showing an example of leakage loss for a pair of 16-by-16 element antenna array tiles (e.g., array 410). FIG. 9 shows the ultra-wide band (UWB) performance of the array in terms of S-parameter S11 (e.g., a mathematical construct that quantifies how RF energy propagates through a multi-port network; S11 may refer to the ratio of signal that reflects from port one for a signal incident on port one) in decibels (dB). For purposes of simulation to make the measurements shown in FIG. 9, similar arrays 410 were placed in near-field distance of approximately 10 millimeters (mm) to measure the coupling insertion loss.

Figure 10:
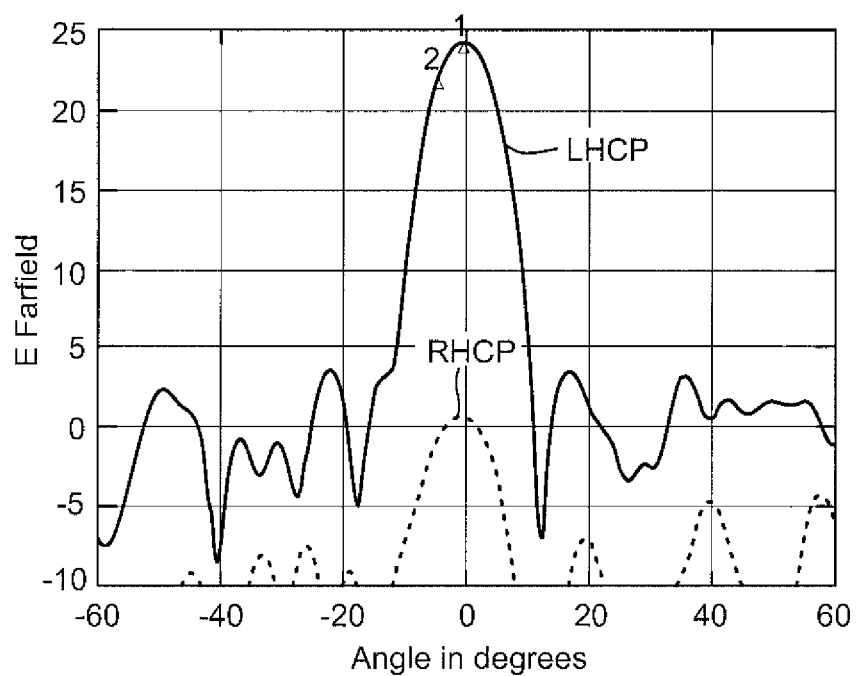
FIG. 10 is a graph showing an example of polarization and side lobe enhancement for a four-by-four element collimated antenna array, in accordance with an embodiment.

FIG. 10 is a graph showing an example of polarization and side lobe enhancement for a 4-by-4 element collimated antenna array, in accordance with an embodiment. In one embodiment, an "out-of-phase squeezing" of the transmitted waves such that a 16 times smaller array can deliver similar gain as the 64-by-64 array 500, so that integration of complex power amplifiers with the antenna array may not be needed, reducing the integration level, power consumption, and cost, and providing suitable beam width and polarization properties. In one embodiment, the enhancement using "out-of-phase squeezing" allows using a 4-by-4 element (16 antenna elements) or 8-by-8 elements (64 antenna element) array instead of, for example, the implementation of the 16-by-16 (256 antenna elements) such as shown in FIGS. 4A and 4B. Such an antenna size reduction confers the capability to reduce various radar system sizes by a factor of 4 as well as packing alternating right-hand circularly polarized (RHCP) and left-hand circularly polarized (LHCP) 4-by-4 arrays in a planar surface to provide higher signal resolution and phase contrast with minimal thickness of the arrays.

In addition, use of a separate wafer scale collimator layer 1100 (see FIG. 11B) that is separated from the antenna array by a certain distance may be implemented. Such a collimator may be implemented as a 4-by-4 array of Teflon based (e.g., $\epsilon_r=2.0$, where $\epsilon_r$ is the relative permittivity of the material as opposed to the vacuum permittivity $\epsilon_o$) collimators that produce a beam width of approximately 8.0 degrees and a gain of 24.4 dB with 24 dB cross polarization. The index of refraction (or permittivity) of the collimators can vary among various embodiments.

Figure 11A:
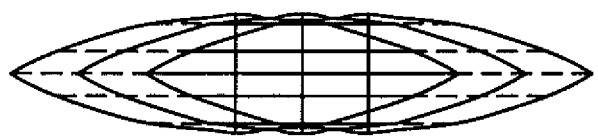
FIG. 11A is a diagram showing a cross section of a collimator for an antenna array, in accordance with an embodiment.
Figure 11B:
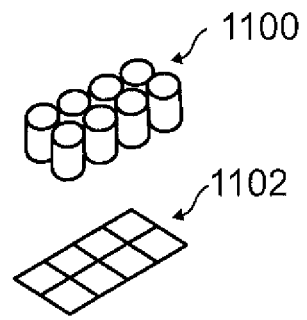
FIG. 11B is a perspective diagram of a collimator and a pair of four-by-four element collimated antenna arrays, in accordance with an embodiment.

The graph in FIG. 10 shows co-polarization and cross-polarization of the LHCP radiation and RHCP radiation of the 4-by-4 array 1102 with Teflon wafer-scale collimator 1100 shown in FIG. 11B. The size of the 4-by-4 array 1102 operating at 83 GHz may be about 6.3 mm by 6.3 mm. FIG. 10 shows side lobes are below 3 dB with a better than 24 dB side lobe suppression compared to the 16-by-16 array that has two strong side lobes at 12 dB. Suppression of side lobes may be a critical factor in signal integrity as a result of antennas with high contrast efficiency (e.g., greater than 95%).

FIG. 11A is a diagram showing a cross section of a collimator for an antenna array such as shown in FIG. 11B; and FIG. 11B is a perspective diagram of a collimator layer and a pair of 4-by-4 element collimated antenna arrays, in accordance with an embodiment. FIG. 11B depicts the implemented collimator 1100 at the position, relative to array 1102, of enhancing the gain and reducing side lobes. As shown in FIG. 11B, one 2-by-2 LHCP array and one 2-by-2 RHCP array may be integrated in the same substrate side by side. Spacing between the collimator 1100 and the array plates 1102 may be about 20 mm for a combination of collimator patterns with each protrusion upward and inward with effective radius of 20 mm and total thickness of 5 mm. Four double-sided protrusions may be placed atop of each 2-by-2 sub-array.

Figure 12A:
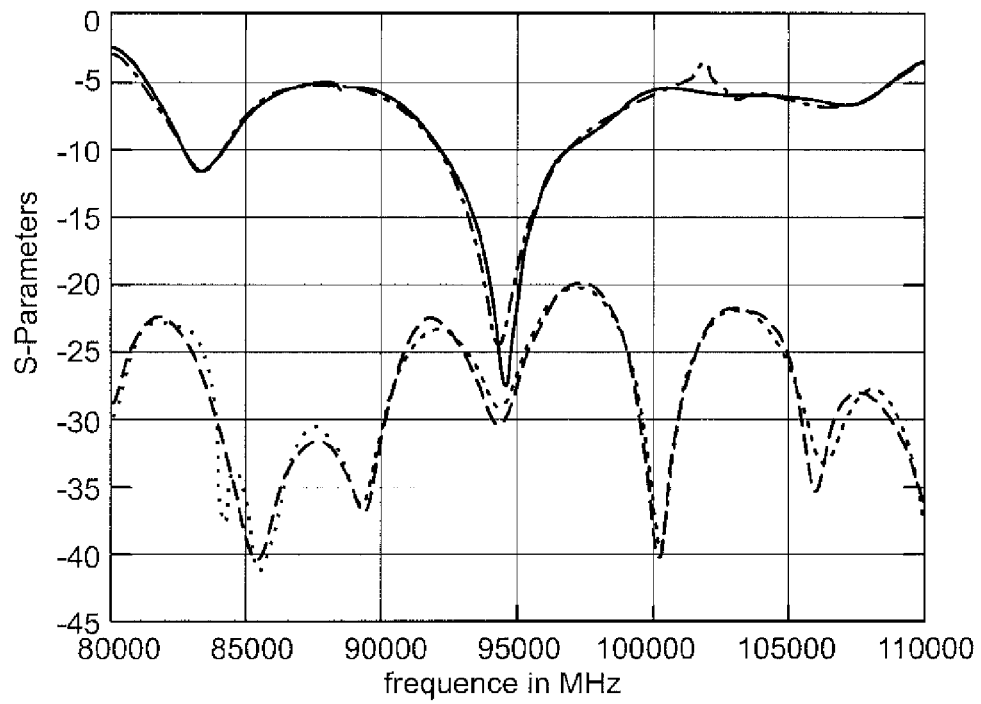
FIGS. 12A and 12B are graphs illustrating an example of cross-coupling and cross-polarization for a pair of four-by-four element antenna arrays, in accordance with an embodiment.
Figure 12B:
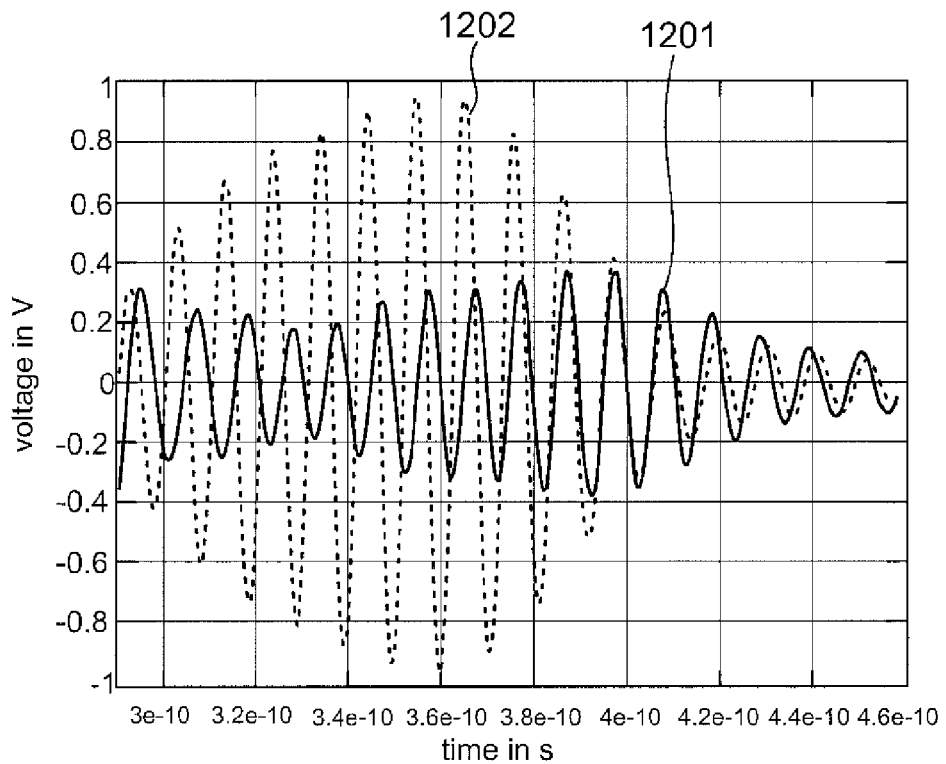

FIGS. 12A and 12B are graphs illustrating an example of cross-coupling and cross-polarization for a pair of 4-by-4 element antenna arrays, in accordance with an embodiment. To verify lack of cross coupling, the S11 and S12 parameters, as shown in FIG. 12A, were measured.

FIG. 12B shows a graph of voltage 1202 returned in response to a launched modulated UWB Gaussian 1201 from a metallic reflector placed 53 mm away from the array 1102 for simulation purposes, illustrating that voltage 1202 is detected by the co-polarized array 1102. Such simulation results may show, for example, that a 4-by-4 element array may have nearly the same gain, superior side lobe suppression, and enhanced cross polarization, while its size is about 25% of an 8-by-8 array and 6% of a 16-by-16 array.

Figures 13A, 13B:
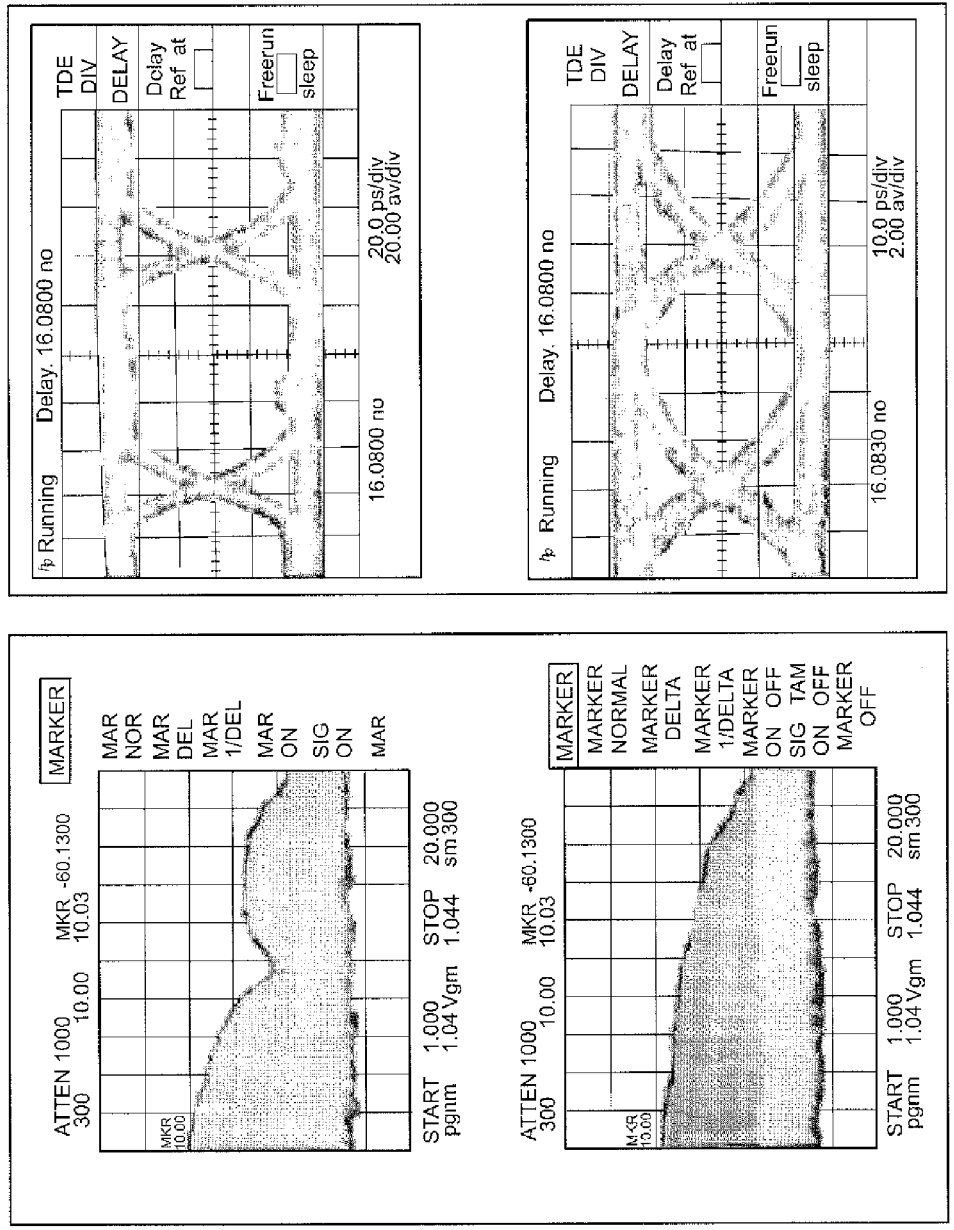
FIG. 13A is a pair of graphs showing frequency spectrum and FIG. 13B is pair of eye-diagram graphs for a seventh-order M-sequence clocked at 10 GHz (upper) and 20 GHz (lower) in accordance with an embodiment.

FIG. 13A is a pair of graphs showing frequency spectrum and FIG. 13B is pair of eye-diagram graphs for a seventh-order M-sequence (e.g., a maximum length PRBS) generator circuit clocked at 10 GHz (upper) and 20 GHz (lower) in accordance with an embodiment. The output eye-diagram and frequency spectrum for a tenth order M-sequence generator circuit, clocked at 10 GHz and 18 GHz, respectively, are qualitatively similar to what is shown in FIG. 13.

Repeater system 1000 may be implemented with an in-situ capability of self testing for bit error rate (BER) that may be performed, for example, at the factory or during field operational conditions. The self-test capability may be implemented, for example, as a loopback capability (e.g., operation in a closed loop, or feedback, state) of the PRBS coding generator for self testing and characterization of BER. The in-situ capability for self testing in the feedback state may be included to test the BER and ensure integrity of transmitter to receiver operation.

During sUAS flight and as part of tracking and pointing for the point-to-point wireless communication link beams (e.g., link 101 and link 102 beams illustrated in FIG. 2A), the repeater system 1000 may be activated automatically when packet drops are below a certain rate (e.g., threshold BER) or power detector is below a certain threshold. This will enable the links to be self tested and activate the tracking and pointing to use the eye opening circuits (e.g., eye-opener 1030, 930) for pointing and alignment of the link beams. This function may be optional and may be disabled as a default, but can, however, be activated based on the user's decision in software (e.g., user configuration of system 100 performed using software).

A coding generator chip with the 7th order M-sequence generator circuit (e.g. PRBS coding generator 1032) may operate at −5.2 Volts (V), consuming 109 milli-Amperes (mA), and a 10th order M-sequence generator circuit (e.g. PRBS coding generator 1032 in another embodiment) may operate at −5.2 V, consuming 136 mA. The signal generator circuits may be operational far above the required 5 GHz clock rate. The 7th order circuit, for example, may be operational up to 20 GHz, while the 10th order circuit, for example, could be clocked to 18 GHz. In another embodiment, the code generator may be used to modulate the Gbps data stream (not shown). Enhanced processing gain can enhance sensitivity up to 30 dB or quadruple the link separation.

Embodiments described herein illustrate but do not limit the disclosure. It should also be understood that numerous modifications and variations are possible in accordance with the principles of the present disclosure. Accordingly, the scope of the disclosure is best defined only by the following claims.

What is claimed is:

1. A system comprising:
   an aircraft having a plurality of wing unit propellers for vertical takeoff and landing;
   a flight control system included in the aircraft for controlling flight of the aircraft both autonomously and from an operator location remote from the aircraft; and
   a radio frequency (RF) repeater system, carried by the aircraft, including:
   a first RF receiver configured to receive a first high-data rate, multiplexed, data signal using a planar array of low noise amplifiers and corresponding antenna arrays to form spatial power combining from a narrow beam transmitter on a first channel;
   a first RF transmitter configured to transmit the first high-data rate, multiplexed, data signal using a planar array of power amplifiers and corresponding antenna arrays to form spatial power combining and beam forming on the first channel;
   a second RF receiver configured to receive a second high-data rate, multiplexed, data signal using a planar array of low noise amplifiers and corresponding antenna arrays to form spatial power combining from a narrow beam transmitter on a second channel;
   a second RF transmitter configured to transmit the second high-data rate, multiplexed, data signal using a planar array of power amplifiers and corresponding antenna arrays to form spatial power combining and beam forming on the second channel; wherein:
   the first transmitter and second receiver are configured to steer a first transmitter antenna beam for the first channel and a second receiver antenna beam for the second channel to a first location;
   the second transmitter and first receiver are configured to steer a second transmitter antenna beam for the second channel and a first receiver antenna beam for the first channel to a second location; and
   the transmitting and receiving are performed by the repeater system to form links for high data rate wireless communication from the aircraft wherein the aircraft is remote from the operator location.

2. The system of claim 1, wherein:
   the flight control system is configured for three-dimensional (3-D) pointing and sustaining directivity of a plurality of antenna beams formed by the antenna arrays independently of a flight path of the aircraft.

3. The system of claim 1, wherein the repeater system includes:
   a high gain antenna array, wherein the gain is at least 39 dBi, shared by at least one of the transmitters and one of the receivers, with side dimensions less than 4.5 inches, placed on a substrate having diameter less than 6.0 inches.

4. The system of claim 1, wherein the repeater system includes:
   an antenna array comprising alternating right-hand circularly polarized (RHCP) and left-hand circularly polarized (LHCP) four-by-four antenna arrays in a planar surface.

5. The system of claim 1, wherein:
   at least one of the transmitters and one of the receivers of the repeater system operate at a carrier frequency of at least 40 GHz; and
   high data rate comprises data rates of at least one giga-bit per second (Gbps).

6. The system of claim 1, further comprising:
   a pseudo-random bit sequence (PRBS) coding generator for generating the first data signal and having a closed loop feedback state that self-tests bit error rate to ensure integrity of transmitter to receiver operation.

7. The system of claim 1, further comprising:
   a global positioning system (GPS) unit carried by the aircraft and in communication with the flight control system; and wherein
   the flight control system sustains a hovering position of the aircraft by a GPS locked hovering operation; and
   the position and universal time detected by the GPS is inserted in an intermediate frequency (IF) of the radio frequency (RF) repeater system for providing repeater performance and flight information.

8. A method comprising:
controlling, both autonomously and from a remote operator location, an aircraft having a plurality of wing unit propellers for vertical takeoff and landing; and
maintaining one or more radio frequency (RF) communication links from the aircraft via a repeater system carried by the aircraft, including:
receiving a first high-data rate, multiplexed, data signal using a planar array of low noise amplifiers and corresponding antenna arrays to form spatial power combining from a narrow beam transmitter on a first channel;
transmitting the first high-data rate, multiplexed, data signal using a planar array of power amplifiers and corresponding antenna arrays to form spatial power combining and beam forming on the first channel;
receiving a second high-data rate, multiplexed, data signal using a planar array of low noise amplifiers and corresponding antenna arrays to form spatial power combining from a narrow beam transmitter on a second channel;
transmitting the second high-data rate, multiplexed, data signal using a planar array of power amplifiers and corresponding antenna arrays to form spatial power combining and beam forming on the second channel;
pointing and tracking a first transmitter antenna beam for the first channel and a second receiver antenna beam for the second channel to a first location; and
pointing and tracking a second transmitter antenna beam for the second channel and a first receiver antenna beam for the first channel to a second location; wherein:
the transmitting and receiving are performed by the repeater system from the aircraft wherein the aircraft is remote from the operator location.

9. The method of claim 8, further comprising:
sustaining a hovering position of the aircraft using GPS.

10. The method of claim 8, further comprising:
spatial power combining and beam forming from a high gain planar antenna array, with side dimensions less than 4.5 inches, placed on a substrate having diameter less than 6.0 inches, wherein the gain is at least 39 dBi.

11. The method of claim 8, further comprising:
spatial power combining and beam forming from an antenna array comprising alternating right-hand circularly polarized (RHCP) and left-hand circularly polarized (LHCP) four-by-four antenna arrays in a planar surface.

12. The method of claim 8, further comprising:
transmitting and receiving at a carrier frequency of at least 40 GHz; and wherein high data rate comprises data rates of at least one giga-bit per second (Gbps).

13. The method of claim 8, further comprising:
generating the first data signal using a pseudo-random bit sequence (PRBS) coding generator;
transitioning the PRBS coding generator to a closed loop feedback state; and
self-testing bit error rate in the closed loop feedback state to ensure integrity of transmitter to receiver operation.

14. The method of claim 8, further comprising:
controlling the aircraft for three-dimensional (3-D) pointing and sustaining directivity of a beam formed by the antenna arrays independently of a flight path of the aircraft.

* * * * *